Patented Aug. 22, 1933

1,923,697

UNITED STATES PATENT OFFICE 1,923,697

PRODUCTION OF AMINO TRIMETHYL-BENZENES

Arthur Alt, Buffalo, N. Y., assignor to National Aniline & Chemical Company, Inc., New York, N. Y., a Corporation of New York No Drawing. Application November 13, 1929
Serial No. 407,016

13 Claims. (Cl. 260—130.5)

This invention relates to the production of the methyl homologues of aniline, and particularly to the production of the aminotrimethylbenzenes.

This invention has for one of its objects a process for the production of aminotrimethylbenzenes which may be practiced economically on a commercial scale. Another object of the invention is to simplify the production of aminotrimethylbenzenes. Still another object is the production of aminotrimethylbenzenes by a process which may be performed at atmospheric pressure.

Other objects of the invention will in part be obvious and will in part appear hereinafter.

The invention accordingly comprises the several steps and the relation and order of one or more of such steps with respect to each of the others, which are exemplified in the following detailed disclosure, and the scope of the application of which will be indicated in the claims.

According to the present invention, it has been found that upon heating the metal halide addition compound or compounds of an N-methylxylidine, or of a mixture of N-methyl xylidines, particularly the addition compound of a halide of a common divalent metal with an N-methylxylidine or a mixture of N-methyl-xylidines, there is obtained in good yields, an addition product of a higher homologue of the respective xylidine, which homologue has a lesser number of methyl substituents in the amino group. From the addition product obtained the higher homologue may be isolated in any convenient manner.

The reaction may be carried out at atmospheric pressure, or at higher pressure in an autoclave. The temperature at which reaction occurs depends upon the particular compound being treated. In general, it may be stated that rearrangement occurs at an appreciable rate above about 230° C., although the speed of reaction is greater between about 250° to 290° C.

In the practice of the present invention, the addition compound of an N-monomethyl-arylamine with a metal halide, more particularly a halide of a common divalent metal and specifically a halide of a metal of the second group of the Periodic System, for example, zinc chloride, is heated at a temperature of 230° to 300° C., in an open vessel, or in an autoclave, for several hours or until rearrangement is substantially complete. In some cases, it may be advantageous to use an open vessel in conjunction with a reflux condenser to prevent loss of material. The reaction mixture is then treated with an alkali in known manner to liberate the free amine which may be recovered and purified in any suitable manner.

As an illustrative embodiment of a manner in which the invention may be practiced, the following examples are presented. The parts are by weight.

Example 1.—50 parts of a mixture of N-methylxylidines (prepared by monomethylating technical mixed xylidines, and containing about 45 per cent. of secondary amines) are charged into a kettle equipped with an agitator, and 51 parts anhydrous zinc chloride are added. The temperature is raised to about 260° to 280°, where it is held for about 6 hours. After cooling, an excess of concentrated caustic soda solution is added, and the mixture heated to insure decomposition of the zinc chloride addition compound. The mixture is permitted to stratify, and the upper oily layer, which contains a mixture of the isomeric aminotrimethylbenzenes, is separated, washed with water and distilled.

In the above example, the equivalent weight of zinc bromide may be used in place of the zinc chloride.

Example 2.—45 parts of a mixture of N-methylxylidines (prepared by monomethylating technical mixed xylidines, and containing about 45 per cent. of secondary amines) are charged into a kettle equipped with an agitator, and a concentrated aqueous solution containing 70 parts of calcium bromide are added. The temperature is raised with agitation to distill off the water. Any oil, which passes off with the water, is separated and returned to the kettle. The mass is then heated under atmospheric pressure for 8 hours at 240° to 250° C. After cooling, an excess of concentrated caustic soda is added, and the mixture is heated to insure liberation of the amine. The mixture is permitted to stratify, and the upper oily layer, which contains a mixture of the isomeric aminotrimethylbenzenes, is separated, washed with water and distilled.

It will be understood that the invention is not limited to the details of the above examples. Although in the preparation of the addition compound it is preferred to use equimolecular weights of the N-methylxylidine and metal halide, greater or lesser proportions may be used, if desired. Further, the invention is not limited to the rearrangement of secondary amines, nor to the production of primary amines. By operating on addition compound of tertiary amines with metal halides, the addition compounds of the corresponding primary, or secondary homologues, or mixtures thereof, may be produced. The homologues produced will have a correspondingly lesser number of methyl substituents in the amino group. Thus, for example, in heating the zinc chloride addition compound of N-dimethylxylidines, there may be produced a mixture comprising the zinc chloride addition compounds of N-monomethylaminotrimethylbenzenes and aminotetramethylbenzene, from which the free amines may be isolated in any convenient manner. Also, a mixture of the zinc chloride addition compounds of xylidine and N-dimethylxylidine may be use for the production of the aminomethylbenzenes.

Since certain changes in carrying out the above process may be made without departing from its scope, it is intended that all matter contained in the above description shall be interpreted as illustrative and not in a limiting sense.

Having described my invention, what I claim as new and desire to secure by Letters Patent is:

1. The process which comprises heating at a temperature of about 230° to about 300° C. the addition compounds of a zinc halide with a mixture of N-methyl-xylidines.

2. The process which comprises heating at a temperature of about 230° to about 300° C., and at atmospheric pressure, the addition compound of a zinc halide with a mixture of N-methyl-xylidines.

3. The process which comprises heating at a temperature of about 240° to about 250° C., and at atmospheric pressure, the calcium bromide addition compound of an N-monomethyl-xylidine.

4. The process which comprises heating at a temperature of about 230° to about 300° C., the addition compound of an N-methyl-xylidine and a zinc halide.

5. The process which comprises heating at a temperature of about 230° to about 300° C., and at atmospheric pressure the addition compound of an N-methyl xylidine and zinc chloride.

6. The process which comprises heating at a temperature of about 230° to about 300° C., and at atmospheric pressure, the addition compound of an N-methyl xylidine and zinc bromide.

7. The process which comprises heating at a temperature of about 240° to about 250° C., the addition compound of an N-methyl xylidine and calcium bromide.

8. The process which comprises heating at a temperature of about 240° to about 250° C., and at atmospheric pressure, the addition compound of an N-methyl xylidine and calcium bromide.

9. The process which comprises heating at a temperature of about 240° to about 250° the addition compound of a mixture of N-methyl xylidines and calcium bromide.

10. The process which comprises heating at a temperature of about 240° to about 250° C., and at atmospheric pressure, the addition compound of a mixture of N-methyl xylidines and calcium bromide.

11. The process which comprises heating at a temperature of about 230° to about 300° C. the addition compound of an N-methyl xylidine and a halide of a metal of the second group of the Periodic System.

12. The process which comprises heating at a temperature of about 230° to about 300° C., and at atmospheric pressure, the addition compound of an N-methyl xylidine and a halide of a metal of the second group of the Periodic System.

13. The process which comprises heating at a temperature of about 230° to about 300° C., the addition compound of an N-methyl xylidine and a bromide of a metal of the second group of the Periodic System.

ARTHUR ALT.